US012755905B2

(12) United States Patent
Kim et al.

(10) Patent No.: US 12,755,905 B2
(45) Date of Patent: Oct. 6, 2026

(54) MULTILAYER CERAMIC CAPACITOR WITH EXTERNAL ELECTRODE HAVING A CARBON LAYER

(71) Applicant: SAMSUNG ELECTRO-MECHANICS CO., LTD., Suwon-si (KR)

(72) Inventors: Mi-Geum Kim, Suwon-si (KR); Sung Han, Suwon-si (KR); Hoseung Jang, Suwon-si (KR); Sangik Cho, Suwon-si (KR); Sunghoon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 162 days.

(21) Appl. No.: 18/647,756

(22) Filed: Apr. 26, 2024

(65) Prior Publication Data

US 2025/0201479 A1 Jun. 19, 2025

(30) Foreign Application Priority Data

Dec. 13, 2023 (KR) ........................ 10-2023-0180313

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ......... H01G 4/30; H01G 4/232; H01G 4/2325
See application file for complete search history.

(56) References Cited

U.S. PATENT DOCUMENTS 9,978,518 B2 * 5/2018 Nishisaka .............. H01G 4/232
11,515,090 B2 * 11/2022 Takeuchi .............. C04B 35/462
2009/0239096 A1 * 9/2009 Ukuma ................ H01G 4/2325
428/675
2013/0258546 A1 10/2013 Kim et al.
(Continued)

FOREIGN PATENT DOCUMENTS

JP H10144561 A * 5/1998
JP 2002158137 A * 5/2002
(Continued)

*Primary Examiner* — David M Sinclair
(74) *Attorney, Agent, or Firm* — Morgan, Lewis & Bockius LLP

(57) ABSTRACT

A multilayer ceramic capacitor may include a ceramic body, a plurality of first internal electrodes and a plurality of second internal electrodes disposed inside the ceramic body, first and second external electrodes disposed respectively on first and second opposing surfaces of the ceramic body, the first and second external electrodes respectively including first and second electrode layers disposed on the first and second surfaces and electrically connected respectively to the plurality of first and second internal electrodes, first and second conductive carbon layers disposed respectively on the first and second electrode layers, and first and second metal layers disposed on a fifth surface of the ceramic body, connecting the first and second surfaces, and in contact respectively with the first and second conductive carbon layers between the first surface and the fifth surface, and between the second surface and the fifth surface.

19 Claims, 4 Drawing Sheets

(56) References Cited

U.S. PATENT DOCUMENTS

| | | | | |
|---|---|---|---|---|
| 2015/0083475 | A1 | 3/2015 | Kim et al. | |
| 2015/0170786 | A1 * | 6/2015 | Hong | H01B 1/02<br>427/79 |
| 2015/0187500 | A1 | 7/2015 | Kang et al. | |
| 2018/0114644 | A1 * | 4/2018 | Sugita | H01G 4/12 |
| 2020/0058443 | A1 * | 2/2020 | Kang | H01G 4/30 |
| 2021/0090804 | A1 | 3/2021 | Park et al. | |
| 2025/0166926 | A1 * | 5/2025 | Nishibayashi | H01G 4/232 |

FOREIGN PATENT DOCUMENTS

| | | | | | |
|---|---|---|---|---|---|
| JP | 2013-214714 | A | | 10/2013 | |
| JP | 2015-065394 | A | | 4/2015 | |
| JP | 2015-128130 | A | | 7/2015 | |
| JP | 2020155719 | A | * | 9/2020 | H01G 4/30 |
| KR | 10-2023-0052711 | A | | 4/2023 | |

* cited by examiner

MULTILAYER CERAMIC CAPACITOR WITH EXTERNAL ELECTRODE HAVING A CARBON LAYER

CROSS-REFERENCE TO RELATED APPLICATION

This application claims priority to and the benefit of Korean Patent Application No. 10-2023-0180313 filed in the Korean Intellectual Property Office on Dec. 13, 2023, the entire contents of which are incorporated herein by reference.

TECHNICAL FIELD

The present disclosure relates to a multilayer ceramic capacitor.

BACKGROUND

Electronic components using ceramic materials include capacitors, inductors, piezoelectric devices, varistors, thermistors, and so on. Among these ceramic electronic components, multilayer ceramic capacitors (MLCCs) have the advantage that they are small, high capacity is guaranteed, and it is easy to mount them, and thus can be used in a variety of electronic devices.

For example, multilayer ceramic capacitors may be used for chip-type capacitors that are mounted on substrates of various electronic products to charge or discharge electricity, including imaging devices such as liquid crystal displays (LCDs), plasma display panels (PDPs), and organic light-emitting diodes (OLEDs), computers, personal portable terminals, and smart phones.

A multilayer ceramic capacitor may include internal electrodes that are disposed inside a ceramic body and external electrodes that are disposed on the exterior of the ceramic body and are connected to the internal electrodes. Meanwhile, if the external electrodes are too thick, there may be a problem that the portion contributing to capacitance becomes relatively smaller.

On the other hand, the external electrodes may be made of conductive carbon layers, and in this case, the connectivity between the internal electrodes and the external electrodes may be insufficient.

SUMMARY

The present disclosure attempts to provide a multilayer ceramic capacitor with improved connectivity between internal electrodes and external electrodes.

Also, the present disclosure attempts to provide a multilayer ceramic capacitor that can be designed to enlarge the portions that contribute to capacitance by reducing the volume of external electrodes with relatively little electrical loss.

However, objects which the embodiments of the present disclosure attempt to achieve are not limited to the above-mentioned object, and can be variously expanded without departing from the technical spirit and scope of the present disclosure.

A multilayer ceramic capacitor according to an embodiment may include a ceramic body that has a first surface and a second surface which face each other in a first direction, a third surface and a fourth surface which face each other in a second direction and connect the first surface and the second surface, and a fifth surface and a sixth surface which face each other in a third direction and connect the first surface and the second surface, a plurality of first internal electrodes and a plurality of second internal electrodes that are disposed inside the ceramic body, a first external electrode disposed outside the ceramic body and connected to the plurality of first internal electrodes, and a second external electrode disposed outside the ceramic body and connected to the plurality of second internal electrodes, and the first external electrode may include a first electrode layer disposed on the first surface and electrically connected to the plurality of first internal electrodes, a first conductive carbon layer disposed on the first electrode layer, and a first metal layer disposed on the fifth surface and in contact with the first conductive carbon layer between the first surface and the fifth surface, and the second external electrode may include a second electrode layer disposed on the second surface and electrically connected to the plurality of second internal electrodes, a second conductive carbon layer disposed on the second electrode layer, and a second metal layer disposed on the fifth surface and in contact with the second conductive carbon layer between the second surface and the fifth surface.

Also, the first conductive carbon layer and the second conductive carbon layer may include one or more of graphite, graphene, carbon nanotube, fullerene, and carbon black.

Further, the first electrode layer may include a conductive metal and glass, and the second electrode layer may include a conductive metal and glass.

Furthermore, the conductive metal of the first electrode layer and the conductive metal of the second electrode layer may include nickel (Ni).

Moreover, the first electrode layer may include a first base layer connected to the plurality of first internal electrodes, and a second base layer disposed on the first base layer, and the second electrode layer may include a third base layer connected to the plurality of second internal electrodes, and a fourth base layer disposed on the third base layer.

In addition, the first base layer and the second base layer may include a conductive metal and glass, and the third base layer and the fourth base layer may include a conductive metal and glass.

Also, the conductive metal of the first base layer and the conductive metal of the third base layer may include nickel (Ni).

Further, the conductive metal of the second base layer and the conductive metal of the fourth base layer may include copper (Cu).

Furthermore, the first external electrode may further include a first plating layer that covers the first metal layer and the first conductive carbon layer, and the second external electrode may further include a second plating layer that covers the second metal layer and the second conductive carbon layer.

Moreover, the first plating layer may include a first layer that covers the first metal layer and the first conductive carbon layer, a second layer that covers the first layer, and a third layer that covers the second layer.

In addition, the first layer may include copper (Cu), and the second layer may include nickel (Ni), and the third layer may include tin (Sn).

Also, the second plating layer may include a first layer that covers the second metal layer and the second conductive carbon layer, a second layer that covers the first layer, and a third layer that covers the second layer.

Further, the first layer may include copper (Cu), and the second layer may include nickel (Ni), and the third layer may include tin (Sn).

According to the multilayer ceramic capacitor of the embodiment, the connectivity between the internal electrodes and the external electrodes can be improved.

Further, according to the multilayer ceramic capacitor of the embodiment, it is possible to enlarge the portions that contribute to capacitance, by reducing the volume of the external electrodes with relatively little electrical loss.

DETAILED DESCRIPTION OF THE EMBODIMENTS

Figure 1:
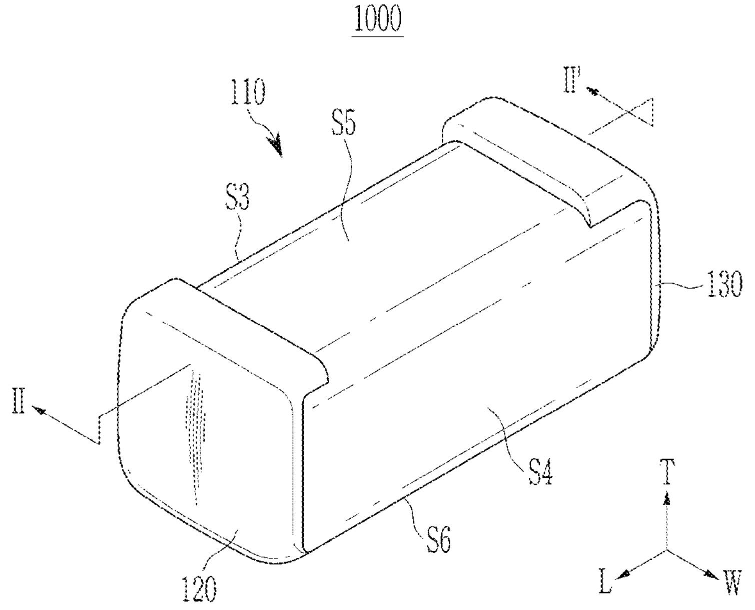
FIG. 1 is a perspective view schematically illustrating a multilayer ceramic capacitor according to an embodiment.

Hereinafter, embodiments of the present disclosure will be described in detail with reference to the accompanying drawings such that those skilled in the art can easily implement them. The drawings and description are to be regarded as illustrative in nature and not restrictive. Like reference numerals designate like elements throughout the specification. Further, some constituent elements in the drawing may be exaggerated, omitted, or schematically illustrated, and a size of each constituent element does not reflect the actual size entirely.

The accompanying drawings are provided for helping to easily understand embodiments disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms. The terms are used only to discriminate one constituent element from another constituent element.

Further, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is "on" a reference portion, the element is located above or below the reference portion, and it does not necessarily mean that the element is located "above" or "on" in a direction opposite to gravity.

In the present specification, it will be understood that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. Therefore, unless explicitly described to the contrary, the word "comprise", and variations such as "comprises" or "comprising", will be understood to imply the inclusion of stated elements but not the exclusion of any other elements.

Further, in the entire specification, when it is referred to as "on a plane", it means when a target part is viewed from above, and when it is referred to as "on a cross-section", it means when the cross-section obtained by cutting a target part vertically is viewed from the side.

Further, throughout the specification, when it is referred to as "connected", this does not only mean that two or more constituent elements are directly connected, but may mean that two or more constituent elements are indirectly connected through another constituent element, are physically connected, electrically connected, or are integrated even though two or more constituent elements are referred as different names depending on a location and a function.

Figure 2:
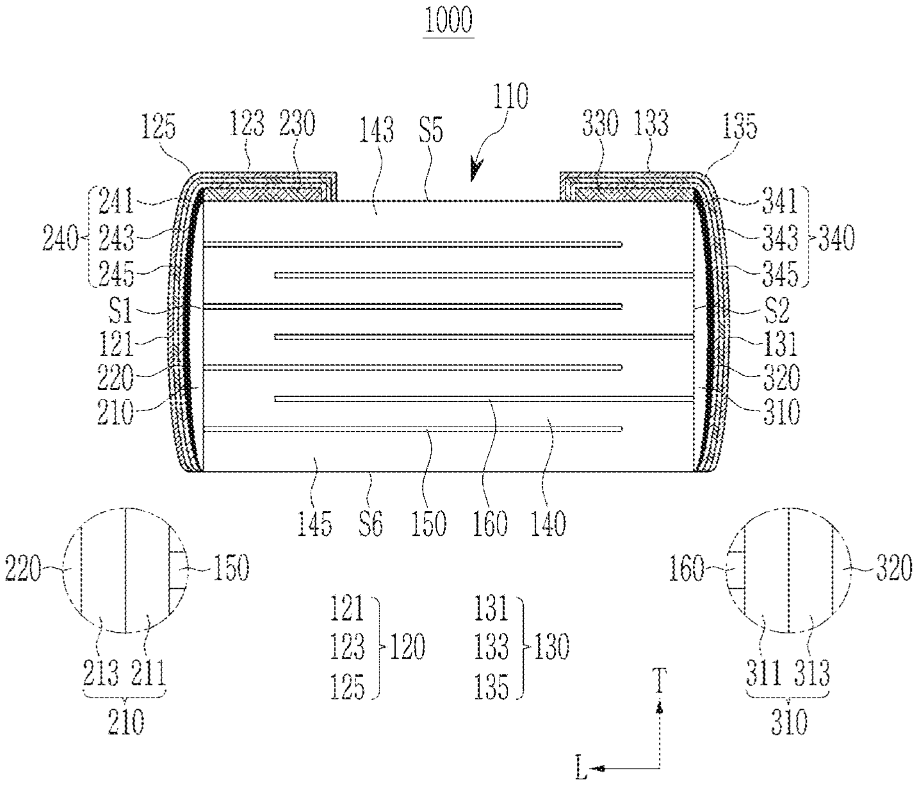
FIG. 2 is a cross-sectional view taken along line II-II' of FIG. 1.
Figure 3:
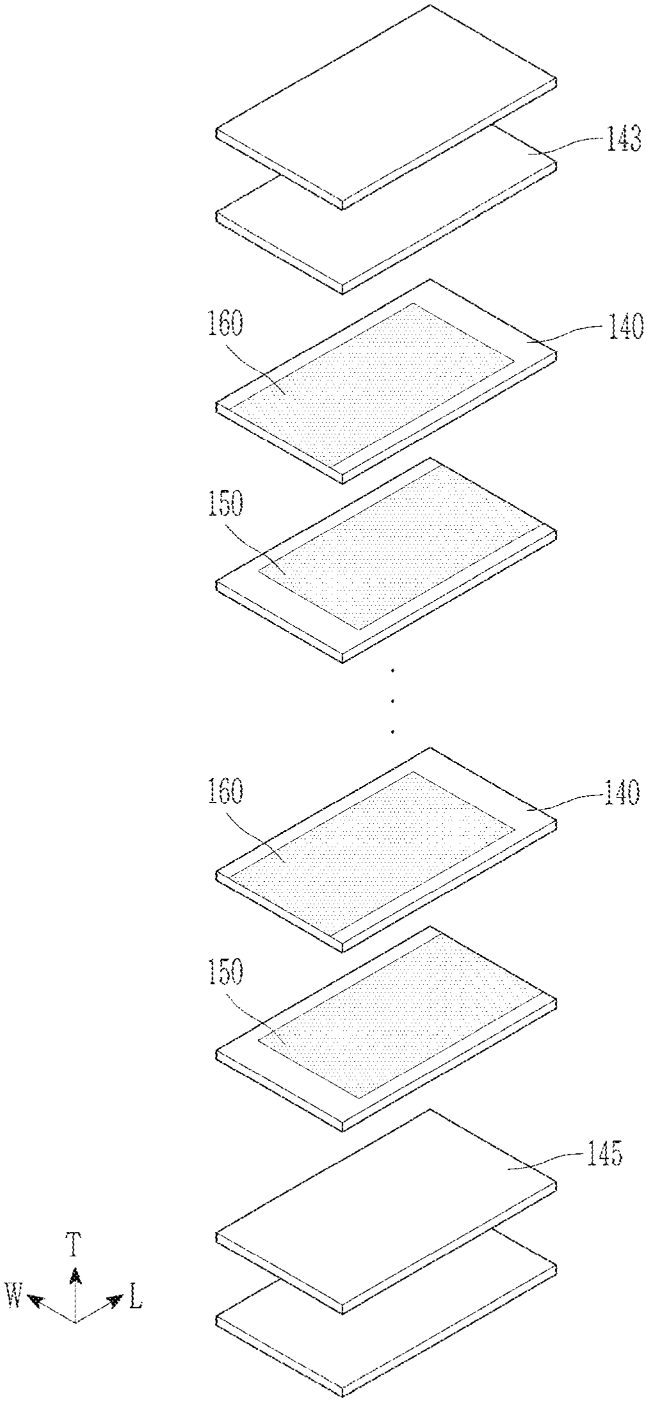
FIG. 3 is an exploded perspective view illustrating the stacked structure of internal electrodes of the multilayer ceramic capacitor in FIG. 1.
Figure 4:
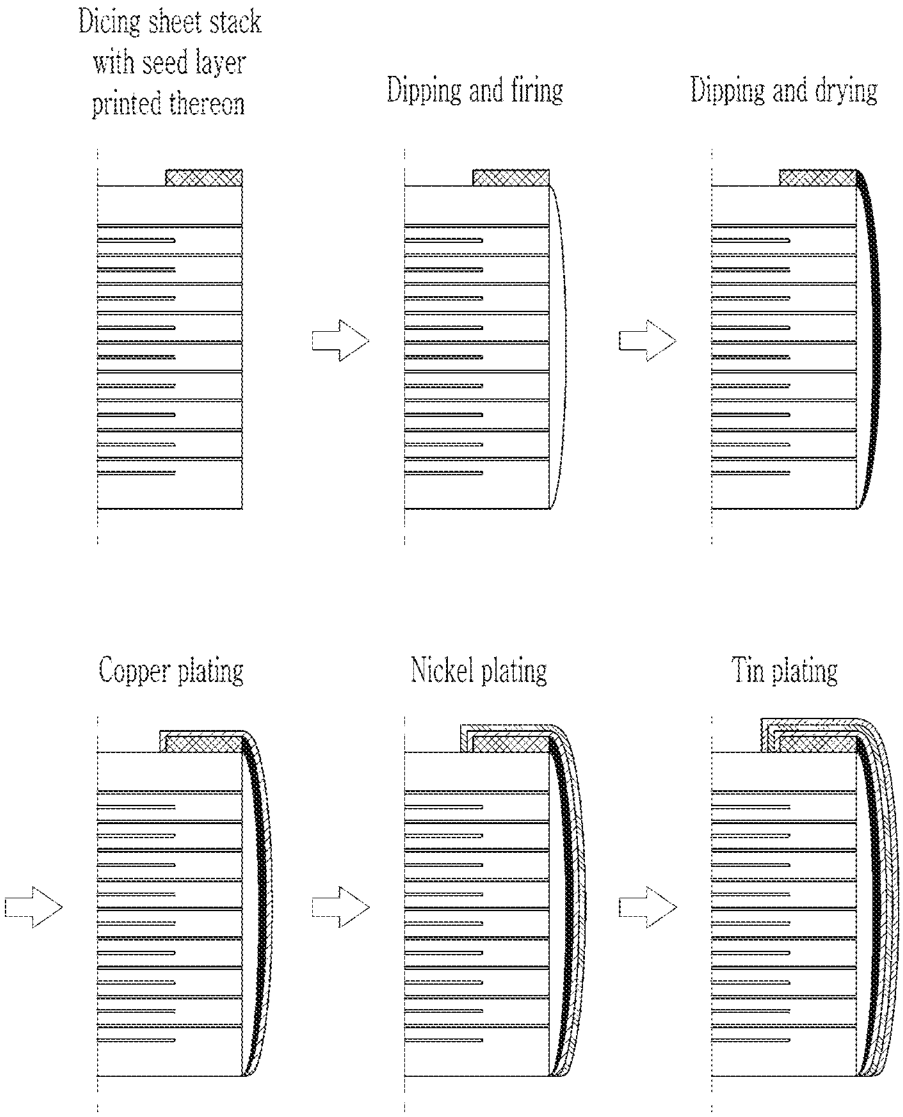
FIG. 4 is a view schematically illustrating a process in which external electrodes of the multilayer ceramic capacitor in FIG. 1 are formed.

FIG. 1 is a perspective view schematically illustrating a multilayer ceramic capacitor according to an embodiment, FIG. 2 is a cross-sectional view taken along line II-II' of FIG. 1, FIG. 3 is an exploded perspective view illustrating the stacked structure of internal electrodes in the multilayer ceramic capacitor of FIG. 1, and FIG. 4 is a view schematically illustrating a process in which external electrodes of the multilayer ceramic capacitor of FIG. 1 are formed. For ease of explanation, only the process of forming one external electrode of the multilayer ceramic capacitor is shown in FIG. 4; however, the other external electrode may be formed in the same process.

Referring to FIGS. 1, 2, 3, and 4, a multilayer ceramic capacitor 1000 according to the present embodiment includes a ceramic body 110, a first external electrode 120, a second external electrode 130, a plurality of first internal electrodes 150, and a plurality of second internal electrodes 160.

First, to clearly describe the present embodiment, directions are defined as follows: the L axis, the W axis, and the T axis shown in the drawings represent axes indicating the length direction, width direction, and thickness direction of the multilayer ceramic capacitor 1000, respectively.

The thickness direction (T-axis direction) may be a direction perpendicular to wide surfaces (main surfaces) of sheet-shaped constituent elements. For example, the thickness direction (T-axis direction) may be used as the same concept as the direction in which dielectric layers 140 are stacked.

The length direction (L-axis direction) may be a direction that is parallel to wide surfaces (main surfaces) of sheet-shaped constituent elements and intersects (or is orthogonal to) the thickness direction (T-axis direction). For example, the length direction (L-axis direction) may be the direction in which the first external electrode 120 and the second external electrode 130 face each other.

The width direction (W-axis direction) may be a direction that is parallel to wide surfaces (main surfaces) of sheet-shaped constituent elements and simultaneously intersects (is orthogonal to) the thickness direction (T-axis direction) and the length direction (L-axis direction).

The ceramic body 110 may have an approximately hexahedral shape, but the present embodiment is not limited thereto. Due to shrinkage during sintering, the ceramic body 110 may have a substantially hexahedral shape, although not a perfect hexahedral shape. For example, the ceramic body 110 may have a substantially cuboid shape having rounded edges or vertices.

In the present embodiment, for ease of explanation, surfaces facing each other in the length direction (L-axis direction) are defined as a first surface S1 and a second surface S2, and surfaces that face each other in the width direction (W-axis direction) and connect the first surface S1 and the second surface S2 are defined as a third surface S3 and the fourth surface S4, and surfaces that face each other in the thickness direction (T-axis direction) and connect the first surface S1 and the second surface S2 are defined as a fifth surface S5 and a sixth surface S6.

Accordingly, a first direction in which the first surface S1 and the second surface S2 face each other may be the length direction (L-axis direction), and a second direction and a third direction which are perpendicular to the first direction and are perpendicular to each other may be the thickness direction (T-axis direction) and the width direction (W-axis direction), respectively, or may be the width direction (W-axis direction) and the thickness direction (T-axis direction), respectively.

Based on an optical microscope or scanning electron microscope (SEM) photograph of a cross section taken in the length direction (L-axis direction) and thickness direction (T-axis direction) at the center of the ceramic body 110 in the width direction (W-axis direction), a length of the ceramic body 110 may refer to the maximum of the lengths of a plurality of line segments, each of which connects two outermost boundary lines of the ceramic body 110 facing each other in the length direction (L-axis direction), shown in the above-mentioned cross section photograph, and is parallel to the length direction (L-axis direction). Alternatively, the length of the ceramic body 110 may refer to the minimum of the lengths of a plurality of line segments, each of which connects two outermost boundary lines of the ceramic body 110 facing each other in the length direction (L-axis direction), shown in the above-mentioned cross section photograph and is parallel to the length direction (L-axis direction). Or, the length of the ceramic body 110 may refer to the arithmetic average of the lengths of at least two line segments of a plurality of line segments, each of which connects two outermost boundary lines of the ceramic body 110 facing each other in the length direction (L-axis direction), shown in the above-mentioned cross section photograph and is parallel to the length direction (L-axis direction).

Based an optical microscope photograph or SEM (Scanning Electron Microscope) photograph of a cross section taken in the length direction (L-axis direction) and thickness direction (T-axis direction) at the center of the ceramic body 110 in the width direction (W-axis direction), a thickness of the ceramic body 110 may refer to the maximum of the lengths of a plurality of line segments, each of which connects two outermost boundary lines of the ceramic body 110 facing each other in the thickness direction (T-axis direction), shown in the above-mentioned cross section photograph, and is parallel to the thickness direction (T-axis direction). Alternatively, the thickness of the ceramic body 110 may refer to the minimum of the lengths of a plurality of line segments, each of which connects two outermost boundary lines of the ceramic body 110 facing each other in the thickness direction (T-axis direction), shown in the above-mentioned cross section photograph and is parallel to the thickness direction (T-axis direction). Or, the thickness of the ceramic body 110 may refer to the arithmetic average of the lengths of at least two line segments of a plurality of line segments, each of which connects two outermost boundary lines of the ceramic body 110 facing each other in the thickness direction (T-axis direction), shown in the above-mentioned cross section photograph and is parallel to the thickness direction (T-axis direction).

Based on an optical microscope photograph or SEM (Scanning Electron Microscope) photograph of a cross section taken in the length direction (L-axis direction) and width direction (W-axis direction) at the center of the ceramic body 110 in the thickness direction (T-axis direction), the width of the ceramic body 110 may refer to the maximum of the lengths of a plurality of line segments, each of which connects two outermost boundary lines of the ceramic body 110 facing each other in the width direction (W-axis direction), shown in the above-mentioned cross section photograph, and is parallel to the width direction (W-axis direction). Alternatively, the width of the ceramic body 110 may refer to the minimum of the lengths of a plurality of line segments, each of which connects two outermost boundary lines of the ceramic body 110 facing each other in the width direction (W-axis direction), shown in the above-mentioned cross section photograph and is parallel to the width direction (W-axis direction). Or, the width of the ceramic body 110 may refer to the arithmetic average of the lengths of at least two line segments of a plurality of line segments, each of which connects two outermost boundary lines of the ceramic body 110 facing each other in the width direction (W-axis direction), shown in the above-mentioned cross section photograph and is parallel to the width direction (W-axis direction).

The ceramic body 110 may include a plurality of dielectric layers 140 stacked in the thickness direction (T-axis direction). The boundaries between the dielectric layers 140 may be unclear. For example, the boundaries between the dielectric layers 140 may be so unclear that it is difficult to observe without using a scanning electron microscope (SEM), and the plurality of dielectric layers 140 may appear to be an integral structure.

The first internal electrode 150 and the second internal electrode 160 may be alternately stacked with the dielectric layer 140 interposed therebetween. This stacked structure may be repeated inside the ceramic body 110, and the internal electrode closest to the fifth surface S5 of the ceramic body 110 may be a first internal electrode 150 or a second internal electrode 160, and the internal electrode closest to the sixth surface S6 may be a first internal electrode 150 or a second internal electrode 160.

The first internal electrode 150 and the second internal electrode 160 have different polarities, and may be electrically insulated from each other by the dielectric layer 140 disposed therebetween.

The first internal electrode 150 and the second internal electrode 160 may be disposed so as to be misaligned with each other in the length direction (L-axis direction), with the dielectric layer 140 interposed therebetween. One end of the first internal electrode 150 may be exposed from the first surface S1 of the ceramic body 110, and one end of the second internal electrode 160 may be exposed from the second surface S2 of the ceramic body 110. The ends of the first internal electrodes 150 exposed from the first surface S1 of the ceramic body 110 may be connected to the first external electrode 120. The ends of the second internal electrodes 160 exposed from the second surface S2 of the ceramic body 110 may be connected to the second external electrode 130.

The first internal electrode 150 and the second internal electrode 160 may be formed on the surfaces of the dielectric layer 140 by printing conductive paste containing a conductive metal. For example, a conductive paste containing nickel (Ni) or a nickel (Ni) alloy may be printed on the surface of the dielectric layer by screen printing or gravure printing to form an internal electrode. However, the present embodiment is not limited thereto.

For example, the average thicknesses of the first internal electrode 150 and the second internal electrode 160 may be in a range from about 0.1 μm to 2 μm.

Here, the thickness of an internal electrode may refer to the average thickness of one internal electrode disposed between two dielectric layers. The average thickness of the internal electrode may refer to an arithmetic average of the values measured at 30 equally spaced points on one internal electrode along the length direction (L-axis direction) in a 10000× magnification scanning electron microscope (SEM) photograph of a cross section taken in the length direction (L-axis direction) and thickness direction (T-axis direction) at the center of the ceramic body 110 in the width direction (W-axis direction). The above-mentioned 30 points may be designated in an active region. By measuring each of the average thicknesses of 10 internal electrodes in this way and obtaining the arithmetic average of the measured values, the average thickness of the internal electrodes may be further generalized.

When a voltage is applied to the first external electrode 120 and the second external electrode 130, a charge accumulates between the first internal electrode 150 and the second internal electrode 160. In other words, capacitance may be obtained between the first internal electrode 150, which is electrically connected to the first external electrode 120, and the second internal electrode 160, which is electrically connected to the second external electrode 130. Capacitance of the multilayer ceramic capacitor 1000 is proportional to an overlapped area of the first internal electrodes 150 and the second internal electrodes 160 that overlap each other along the thickness direction (T-axis direction).

In other words, the multilayer ceramic capacitor 1000 includes an active region and a margin region. The active region may refer to the region where the first internal electrodes 150 and the second internal electrodes 160 overlap along the thickness direction (T-axis direction), and the margin region may refer to the region between the active region and the first surface S1 of the ceramic body 110 and the region between the active region and the second surface S2 of the ceramic body 110.

A first cover layer 143 and a second cover layer 145 may be disposed on the outer sides of the active region in the thickness direction (T-axis direction).

The first cover layer 143 is disposed between the fifth surface S5 of the ceramic body 110 and an internal electrode closest thereto. The second cover layer 145 is disposed between the sixth surface S6 of the ceramic body 110 and an internal electrode closest thereto.

In other words, inside the ceramic body 110, the first cover layer 143 may be disposed on the uppermost internal electrode, and the second cover layer 145 may be disposed on the lowermost internal electrode. The first cover layer 143 and the second cover layer 145 may have the same composition as that of the dielectric layer 140. Each of the first cover layer 143 and the second cover layer 145 may be made by stacking one or more dielectric layers on the outer surface of the uppermost internal electrode or the outer surface of the lowermost internal electrode.

The first cover layer 143 and the second cover layer 145 may serve to prevent damage to the first internal electrodes 150 and the second internal electrodes 160 by physical or chemical stress.

The dielectric layers 140 may contain a ceramic material with a high permittivity. For example, the ceramic material may contain a dielectric ceramic including components such as $BaTiO_3$, $CaTiO_3$, $SrTiO_3$, or $CaZrO_3$. Also, auxiliary components such as a manganese (Mn) compound, an iron (Fe) compound, a chromium (Cr) compound, a cobalt (Co) compound, a nickel (Ni) compound, etc. may be further included in these components. For example, the dielectric layers may comprise $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), etc. are partially dissolved in $BaTiO_3$, but the present disclosure is not limited thereto.

Further, the dielectric layers 140 may further include one or more of ceramic additives, organic solvents, plasticizers, binders, and dispersing agents. Examples of the ceramic additives may include transition metal oxides or carbides, rare earth elements, magnesium (Mg), aluminum (Al), etc.

As an example, the average thicknesses of the dielectric layer 140 may be in a range from 0.1 μm to 10 μm, but the present embodiment is not limited thereto.

The first external electrode 120 and the second external electrode 130 are disposed outside the ceramic body 110.

The first external electrode 120 may be disposed on the first surface S1 of the ceramic body 110 and extend onto the fifth surface S5. In other words, the first external electrode 120 may be disposed on the first surface S1 and fifth surface S5 of the ceramic body 110. In other embodiments, the first external electrode 120 may also be disposed on the third surface S3 and fourth surface S4 of the ceramic body 110.

The second external electrode 130 may be disposed on the second surface S2 of the ceramic body 110 and extend onto the fifth surface S5. In other words, the second external electrode 130 may be disposed on the second surface S2 and fifth surface S5 of the ceramic body 110. In other embodiments, the second external electrode 130 may also be disposed on the third surface S3 and fourth surface S4 of the ceramic body 110.

The first external electrode 120 includes a first connection portion 121, a first band portion 123, and a first edge portion 125.

The first connection portion 121 is a portion that covers the first surface S1 of the ceramic body 110 and is in contact with the exposed ends of the first internal electrode 150 to be electrically connected to the first internal electrode 150.

In other embodiments, the first connection portion 121 may cover a portion of the first surface S1 of the ceramic body 110.

The first band portion 123 extends from the first connection portion 121 and covers at least a portion of the fifth surface S5 of the ceramic body 110. The first band portion 123 may help the first external electrode 120 adhere more strongly to the ceramic body 110.

The first edge portion 125 may be a portion that connects the first connection portion 121 and the first band portion 123.

The second external electrode 130 includes a second connection portion 131, a second band portion 133, and a second edge portion 135.

The second connection portion 131 is a portion that covers the second surface S2 of the ceramic body 110 and is in contact with the exposed ends of the second internal electrode 160 to be electrically connected to the second internal electrode 160.

In other embodiments, the second connection portion 131 may cover a portion of the second surface S2 of the ceramic body 110.

The second band portion 133 extends from the second connection portion 131 and covers at least a portion of the fifth surface S5 of the ceramic body 110. The second band portion 133 may help the second external electrode 130 adhere more strongly to the ceramic body 110.

The second edge portion 135 may be a portion that connects the second connection portion 131 and the second band portion 133.

Based on an optical microscope or scanning electron microscope (SEM) photograph of a cross section taken in the length direction (L-axis direction) and thickness direction (T-axis direction) at the center of the multilayer ceramic capacitor 1000 in the width direction (W-axis direction), in the multilayer ceramic capacitor 1000 shown in the above-mentioned photograph, the first connection portion 121 and the second connection portion 131 may have a shape substantially parallel to the thickness direction (T-axis direction), and the first band portion 123 and the second band portion 133 may have a shape substantially parallel to the length direction (L-axis direction), and the first edge portion 125 and the second edge portion 135 may have curved line shape. The above-mentioned curved line shape may be a curved line shape that having a tangent whose slope changes from a direction parallel to the thickness direction (T-axis direction) to a direction parallel to the length direction (L-axis direction) (or vice versa).

The first external electrode 120 may include a first electrode layer 210, a first conductive carbon layer 220, a first metal layer 230, and a first plating layer 240, and the second external electrode 130 may include a second electrode layer 310, a second conductive carbon layer 320, a second metal layer 330, and a second plating layer 340.

The first external electrode 120 may include the first electrode layer 210, the first conductive carbon layer 220, the first metal layer 230, and the first plating layer 240.

The first electrode layer 210 is disposed on the first surface S1 of the ceramic body 110, and is in contact with the exposed ends of the plurality of first internal electrodes 150 to be electrically connected to the first internal electrode 150. The first electrode layer 210 does not extend from the first surface S1 of the ceramic body 110 to any other surface. In other words, the first electrode layer 210 is not disposed on the third surface S3, fourth surface S4, fifth surface S5, and sixth surface S6 of the ceramic body 110.

The first electrode layer 210 may include a conductive metal and glass. For example, the first electrode layer 210 may include one or more of silver (Ag), lead (Pb), platinum (Pt), nickel (Ni), copper (Cu), and alloys thereof.

The first electrode layer 210 may be a sintered electrode containing a conductive metal and glass. The first electrode layer 210 may be formed by dipping the first surface S1 of the ceramic body 110 in slurry containing a conductive metal and glass and then sintering. Alternatively, the first electrode layer 210 may be formed by transferring a sheet containing a conductive metal and glass to the ceramic body 110.

The first electrode layer 210 may include a first base layer 211 and a second base layer 213.

The first base layer 211 may be directly connected to the plurality of first internal electrodes 150. The first base layer 211 may include, for example, a conductive metal and glass. The conductive metal may include nickel (Ni).

The second base layer 213 may be disposed on the first base layer 211. The second base layer 213 may include, for example, a conductive metal and glass. The conductive metal may include copper (Cu).

The first conductive carbon layer 220 is disposed on the first electrode layer 210. For example, the first conductive carbon layer 220 may cover the first electrode layer 210.

The first conductive carbon layer 220 may include a conductive carbon material. For example, the first conductive carbon layer 220 may include one or more of graphite, graphene, carbon nanotube, fullerene, and carbon black.

For example, a ceramic body is partially dipped in a dispersion containing a conductive carbon material to be applied according to the degree of dilution of the solution, heat dried at 170° C. for 10 minutes, and cured to form a solid conductive carbon layer to a thickness of about 0.05 μm or more and 20 μm or less. Here, by setting the dilution ratio such that the content of the solid contents of the solution containing the conductive carbon material is approximately 1 wt % or more and 20 wt % or less, and by adjusting the number of repetitions of the dipping and drying process, the thickness of the conductive carbon layer may be adjusted.

Unlike the present embodiment, the first conductive carbon layer 220 may be disposed directly on the first surface S1 of the ceramic body 110 without the first electrode layer 210 disposed on the first surface S1. However, in this case, if the ends of the first internal electrodes 150 protrude shortly, or oxide films exist on the exposed surfaces of the first internal electrodes 150, there is a possibility that the electrical characteristics may be degraded even if the first conductive carbon layer 220 and the first internal electrodes 150 are connected.

In contrast, according to the present embodiment, since the first electrode layer 210 containing a conductive metal is connected to the first internal electrodes 150 and then the first conductive carbon layer 220 is disposed on the first electrode layer 210, the above-mentioned problems can be remedied and the electrical characteristics can be sufficiently secured.

The first metal layer 230 is disposed on the fifth surface S5 of the ceramic body 110.

The first metal layer 230 may cover a portion of the fifth surface S5 of the ceramic body 110 at a portion spaced from the center portion of the fifth surface S5 toward the first surface S1. For example, the first metal layer 230 may be in contact with the edge of the fifth surface S5 of the ceramic body 110 close to the first surface S1, the edge of the fifth surface close to the third surface S3, and the edge of the fifth surface close to the fourth surface S4, and cover a portion of the fifth surface S5.

The first metal layer 230 may be formed, for example, in the following manner.

After a sheet stack is formed by stacking ceramic green sheets with internal electrodes formed on the surfaces on top of each other, a metal pattern is formed by printing a conductive paste on the surface of the sheet stack. For example, a conductive paste containing nickel (Ni), copper (Cu), a nickel (Ni) alloy, or a copper (Cu) alloy may be printed on the surface of the sheet stack by screen printing or gravure printing to form a metal pattern. However, the present embodiment is not limited thereto. The sheet stack with the metal pattern is diced to manufacture green chips. In this dicing process, the metal pattern is cut into first metal layers.

The edge of the first metal layer 230 close to the first surface S1 may be in contact with the first conductive carbon layer 220. Here, the first metal layer 230 and the first conductive carbon layer 220 may have a continuous interface. Therefore, the surface of the ceramic body 110 or the surface of the first electrode layer 210 may not be exposed between the first metal layer 230 and the first conductive carbon layer 220.

The interface of the first metal layer 230 and the first conductive carbon layer 220 may be present at the first edge portion 125 between the first surface S1 and the fifth surface S5 of the ceramic body 110, but is not limited thereto. For example, the interface of the first metal layer 230 and the first conductive carbon layer 220 may be on the interface of the first edge portion 125 and the fifth surface S5. However, since the first conductive carbon layer 220 is disposed on the first surface S1 of the ceramic body 110, the interface of the first metal layer 230 and the first conductive carbon layer 220 is not present on the first surface S1 of the ceramic body 110.

Unlike the present embodiment, if the first external electrode 120 does not include the first conductive carbon layer 220, there may be a gap between the first metal layer 230 and the first electrode layer 210. In particular, the thinner the first electrode layer 210 is formed, the greater the likelihood of a gap being present. If the first plating layer 240 is formed while a gap exists between the first metal layer 230 and the first electrode layer 210, the connection between the first connection portion 121 and first band portion 123 of the first external electrode 120 may be broken or insufficient.

In contrast, according to the present embodiment, since the first conductive carbon layer 220 serves to connect the first metal layer 230 and the first electrode layer 210, it is possible to secure sufficient connection between the first connection portion 121 and the first band portion 123 even if a gap exists between the first metal layer 230 and the first electrode layer 210.

The first conductive carbon layer 220 and the first metal layer 230 may be covered by the first plating layer 240. In other words, the first conductive carbon layer 220 on the first surface S1 of the ceramic body 110 and the first metal layer 230 on the fifth surface S5 may be covered by the first plating layer 240 at the same time.

The first plating layer 240 may be formed by directly plating a conductive metal on the first conductive carbon layer 220 and the first metal layer 230. In other words, the first conductive carbon layer 220 and the first metal layer 230 may serve as seed layers for plating. Here, the conductive metal may include nickel (Ni), copper (Cu), tin (Sn), palladium (Pd), platinum (Pt), gold (Au), silver (Ag), tungsten (W), titanium (Ti), lead (Pb), and the like, or alone or an alloy thereof but the present embodiment is not limited thereto.

The first plating layer 240 may comprise a plurality of layers. For example, the first plating layer 240 may include a first layer 241 that covers both the first conductive carbon layer 220 and the first metal layer 230, a second layer 243 that covers the first layer 241, and a third layer 245 that covers the second layer 243.

The first layer 241 may include copper (Cu), the second layer 243 may include nickel (Ni), and the third layer 245 may include tin (Sn); however, the present embodiment is not limited thereto.

The second external electrode 130 may include the second electrode layer 310, the second conductive carbon layer 320, the second metal layer 330, and the second plating layer 340. The structure and constituent elements of the second external electrode 130 are identical to the structure and constituent elements of the first external electrode 120, except for its location, so a redundant description of the second external electrode 130 will be omitted.

Referring to FIG. 4, a green chip may be manufactured by dicing a sheet stack with a metal pattern printed thereon, and the first metal layer 230 may be formed on the fifth surface S5 of the ceramic body 110 by firing the green chip. Then, the first electrode layer 210 may be formed on the first surface S1 of the ceramic body 110 by partially dipping the ceramic body 110 into a slurry containing a conductive metal and glass and firing. Alternatively, the first electrode layer 210 may be formed by transferring a sheet containing a conductive metal (such as copper (Cu) or nickel (Ni)) to the first surface S1 of the ceramic body 110. Subsequently, the first conductive carbon layer 220 may be formed to cover the first electrode layer 210. As an example, a solid conductive carbon layer may be formed to have a thickness of about 0.05 μm or more and 20 μm or less, by partially dipping the ceramic body into a dispersion containing a conductive carbon material to be applied according to the degree of dilution of the solution, heat drying at 170° C. for 10 minutes, and curing. Here, the thickness of the conductive carbon layer may be adjusted by setting the dilution ratio such that the content of solid contents of the solution containing the conductive carbon material is approximately 1 wt % or more and 20 wt % or less, and by adjusting the number of repetitions of the dipping and drying process. Subsequently, the first plating layer 240 may be formed by directly plating a conductive metal on the first conductive carbon layer 220 and the first metal layer 230. For example, Copper (Cu) may be electroplated to form the first plating layer 240. Here, the first conductive carbon layer 220 and the first metal layer 230 may serve as seed layers for plating. Since the first conductive carbon layer 220 is disposed on the first surface S1 of the ceramic body 110 and the first metal layer 230 is disposed on the fifth surface S5, the first plating layer 240 is not disposed on the third surface S3, fourth surface S4, and sixth surface S6 of the ceramic body 110. Accordingly, the first external electrode 120 and the second external electrode 130 are not disposed on the third surface S3, fourth surface S4, and sixth surface S6 of the ceramic body 110.

In the present embodiment, since the first external electrode 120 is not disposed on the third surface S3 and fourth surface S4 of the ceramic body 110, the width of the ceramic body 110 may be increased by that amount. Further, since the first external electrode 120 is not disposed on the sixth surface S6 of the ceramic body 110, the thickness of the ceramic body 110 may be increased by that amount. If the width of the ceramic body 110 is increased, the width of the internal electrodes that affects the capacitance can be increased by that amount, and if the thickness of the ceramic body 110 is increased, the number of internal electrodes that are stacked can be increased. Accordingly, the capacitance of the multilayer ceramic capacitor can be increased.

While the present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims.

DESCRIPTION OF SYMBOLS

1000: Multilayer ceramic capacitor
110: Ceramic body
120: First external electrode
121: First connection portion
123: First band portion
125: First edge portion
130: Second external electrode
131: Second connection portion
133: Second band portion 135: Second edge portion
140: Dielectric layer
143: First cover layer
145: Second cover layer
150: First internal electrode
160: Second internal electrode
210: First electrode layer
220: First conductive carbon layer
230: First metal layer
240: First plating layer
310: Second electrode layer
320: Second conductive carbon layer
330: Second metal layer
340: Second plating layer

What is claimed is:

1. A multilayer ceramic capacitor comprising:

a ceramic body having a first surface and a second surface opposing each other in a first direction, a third surface and a fourth surface opposing each other in a second direction and connect the first and second surfaces, and a fifth surface and a sixth surface opposing each other in a third direction and connect the first and second surfaces;

a plurality of first internal electrodes and a plurality of second internal electrodes that are disposed inside the ceramic body;

a first external electrode disposed outside the ceramic body and connected to the plurality of first internal electrodes; and a second external electrode disposed outside the ceramic body and connected to the plurality of second internal electrodes, wherein the first external electrode includes:

a first electrode layer disposed on the first surface and electrically connected to the plurality of first internal electrodes, a first conductive carbon layer disposed on the first electrode layer, and a first metal layer disposed only on a portion of the fifth surface and in contact with the first conductive carbon layer such that an edge of the first metal layer contacts an edge of the first conductive carbon layer at an intersection of the first surface and the fifth surface, and the second external electrode includes:

a second electrode layer disposed on the second surface and electrically connected to the plurality of second internal electrodes, a second conductive carbon layer disposed on the second electrode layer, and a second metal layer disposed only on a portion of the fifth surface and in contact with the second conductive carbon layer such that an edge of the second metal layer contacts an edge of the second conductive carbon layer at an intersection of the second surface and the fifth surface.

2. The multilayer ceramic capacitor of claim 1, wherein the first conductive carbon layer and the second conductive carbon layer include one or more of graphite, graphene, carbon nanotube, fullerene, and carbon black.

3. The multilayer ceramic capacitor of claim 1, wherein the first and second electrode layers include a conductive metal and glass.

4. The multilayer ceramic capacitor of claim 3, wherein the conductive metal includes nickel (Ni).

5. The multilayer ceramic capacitor of claim 1, wherein the first electrode layer includes a first base layer connected to the plurality of first internal electrodes, and a second base layer disposed on the first base layer, and the second electrode layer includes a third base layer connected to the plurality of second internal electrodes, and a fourth base layer disposed on the third base layer.

6. The multilayer ceramic capacitor of claim 5, wherein the first base layer, the second base layer, the third base layer and the fourth base layer include a conductive metal and glass.

7. The multilayer ceramic capacitor of claim 6, wherein the conductive metal of the first base layer and the conductive metal of the third base layer include nickel (Ni).

8. The multilayer ceramic capacitor of claim 6, wherein the conductive metal of the second base layer and the conductive metal of the fourth base layer include copper (Cu).

9. The multilayer ceramic capacitor of claim 1, wherein the first external electrode further includes a first plating layer that covers the first metal layer and the first conductive carbon layer, and the second external electrode further includes a second plating layer that covers the second metal layer and the second conductive carbon layer.

10. The multilayer ceramic capacitor of claim 9, wherein the first plating layer includes:

a first layer that covers the first metal layer and the first conductive carbon layer;

a second layer that covers the first layer; and a third layer that covers the second layer.

11. The multilayer ceramic capacitor of claim 10, wherein the first layer includes copper (Cu), and the second layer includes nickel (Ni), and the third layer includes tin (Sn).

12. The multilayer ceramic capacitor of claim 9, wherein the second plating layer includes:

a first layer that covers the second metal layer and the second conductive carbon layer;

a second layer that covers the first layer; and a third layer that covers the second layer.

13. The multilayer ceramic capacitor of claim 12, wherein the first layer includes copper (Cu), and the second layer includes nickel (Ni), and the third layer includes tin (Sn).

14. An external electrode for a multilayer ceramic capacitor, comprising:

a electrode layer disposed on a side surface of a body of the multilayer ceramic capacitor and electrically connected to a first set of internal electrodes;

a conductive carbon layer disposed on the electrode layer; and a metal layer disposed only on a portion of a top surface of the body and in contact with an edge of the conductive carbon layer at an intersection of the side surface and the top surface, the top surface being substantially perpendicular to the side surface.

15. The external electrode of claim 14, wherein the conductive carbon layer comprises one or more of graphite, graphene, carbon nanotube, fullerene, and carbon black.

16. The external electrode of claim 14, wherein the electrode layer comprises a first base layer contacting the first set of internal electrodes and a second base layer disposed on the first base layer.

17. The external electrode of claim 16, wherein the first base layer comprises a first conductive metal and glass, and the second base layer comprises a second conductive metal and glass, the second conductive metal being different from the first conductive metal.

18. The external electrode of claim 14, further comprising a plating layer covering the metal layer and the conductive carbon layer.

19. The external electrode of claim 18, wherein the plating layer comprises:

a first layer covering the metal layer and the conductive carbon layer, the first layer comprising copper;

a second layer covering the first layer and comprising nickel; and a third layer covering the second layer and comprising tin.

* * * * *